3,679,622
Patented July 25, 1972

3,679,622
NITROALKYL PIPERAZINES AS ANTIBACTERIAL AGENTS IN AQUEOUS PAINT SOLUTIONS

Nathaniel Grier, Englewood, N.J., assignor to Merck & Co., Inc., Rahway, N.J.
No Drawing. Application June 21, 1968, Ser. No. 738,843, which is a division of application Ser. No. 457,802, May 21, 1965, now Patent No. 3,399,199, dated Aug. 27, 1968. Divided and this application Apr. 23, 1971, Ser. No. 137,048
Int. Cl. C08d 7/12
U.S. Cl. 260—29.7 N
2 Claims

ABSTRACT OF THE DISCLOSURE

Antimicrobial compositions containing piperazine nitroalkanes useful as soil sterilants and algicides, etc., for agricultural and industrial application.

---

This application is a division of prior co-pending application Ser. No. 738,843, filed June 21, 1968, which in turn, is a division of prior application Ser. No. 457,802, filed May 21, 1965, now U.S. Pat. No. 3,399,199, issued Aug. 27, 1968.

This invention relates to improved compounds and compositions for use as antimicrobial agents (fungicidal, bactericidal) antimycotic agents, and particularly as soil sterilants and fumigants, and also as pesticides (algicides, insecticides, ovicides, larvicides and nematocides) and as anthelmintics, and to processes for preparing and applying the same industrially, agriculturally and therapeutically.

More specifically, the invention relates to compositions containing, and to processes utilizing, various substituted alkylnitro compounds characterized by a piperazino group on the β-carbon (the carbon substituted by nitro being α) and embraced by the following general formulas:

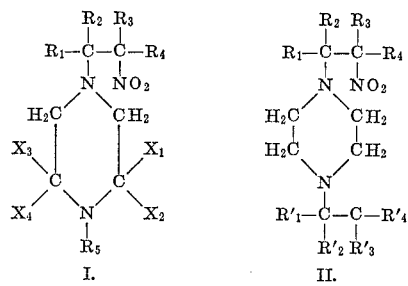

and their acid and metal salts. In these formulas, $R_1$ to $R_4$ and $R'_1$ to $R'_4$ can be the same or different members of the class consisting of hydrogen, alkyl (having 1 to 30 carbons, straight chain or branched, preferably lower alkyl, i.e. having up to 8 carbons) unsubstituted or substituted, as by one or more of the four halogens, nitro, amino, lower-alkyl-substituted amino, hydroxyl, alkoxy (having 1 to 30 carbons, preferably lower alkoxy), aryl (such as phenyl, naphthyl, fluorenyl, anthracenyl, and phenanthryl), the alkyl (of the alkoxy) and aryl groups being unsubstituted or substituted, as by one or more of the four halogens, nitro, alkyl up to 30 carbons, preferably 1 to 8, amino, lower-alkyl-substituted amino, and hydroxyl, and alkyl-ether (having 1 to 30 carbons, preferably lower alkyl-ethers), and aryl-ether groups, the aryl group being as above defined; heterocyclics, such as thienyl, furyl, thiazolyl, pyridyl, oxazolyl and quinolyl, and substituted heterocyclics as by fluoro, chloro, bromo or iodo groups, nitro, lower alkyl (up to 8 carbons), amino and alkoxy (up to 30 carbons but preferably lower alkoxy); $R_5$ and $X_1$ to $X_4$ can be the same or different members of the group consisting of hydrogen, lower alkyl, aryl and aralkyl, all as above defined, carboxy, carboalkoxy and hydroxyalkyl (having up to 30 carbons but preferably up to 8 carbons).

A method of synthesis of compounds of this invention can follow the known procedure in which aldehydes or ketones are condensed with an α-nitroalkane to form the corresponding nitroolefin (the nitro group being attached to an olefinic carbon) and water:

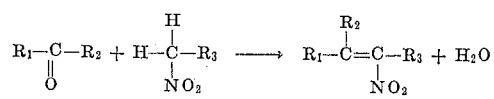

Catalysts employed for the condensation are usually alkaline such as the inorganic alkalis, organic amines, or quaternary ammonium bases. The resultant water, and any water employed as reaction medium, can be removed as an azeotrope with water-immiscible solvents such as benzene, toluene, xylene, carbon tetrachloride, etc., or allowed to remain in the reaction mixture. Many known variations can be employed for the synthesis. Acidic media have also been used for the preparation of the nitroolefins. For example, glacial acetic acid containing a low concentration of amine acetates serves well as a means for effecting these condensations. Hydrochloric acid and hydrogen chloride gas have also been used. Some use has been made of strong Lewis acids as catalysts as well as acidic ion exchange resins.

The second step of the synthesis involves the addition of a secondary amine in the form of piperazine or substituted piperazine to the α,β-unsaturated nitro compound. The reaction can be run at a range of temperature extending from below room temperature, i.e., 0–10° C., to as high as 150° C.; solvents for the addition include the aliphatic alcohols, ketones, and hydrocarbons. Mixtures of these can be used along with water in varying concentrations. Ethers have been frequently selected as the solvents of choice. As a general rule, the major limitation as to the solvent system employed, is that it should be inert toward the reactants. In some instances it is possible to perform the addition using the reactants as such for the solvent. As is known, a selective choice of solvents can be made in those cases where a particular sterospecific mode of addition is desired, which results in a dominant yield of a given isomer.

I have found that the steps of forming the nitroolefin and adding on the amine can with advantage be performed as a single operation by mixing the keto-containing compound, the nitromethane (or other lower nitroalkane having up to 8 carbons) and the secondary amine and causing them to react.

The ratio of reactants can be varied within wide limits, usually stoichiometric amounts are used. However, in the addition of unsubstituted piperazine to the ethylenic nitro compounds, an unexpected result was obtained when ratios of reactants were employed which should have yielded or at least favored adducts consisting of two moles of the nitroolefin and one mole of the piperazine; yet a 1:1 adduct was obtained. In other instances, when a high ratio of unsubstituted piperazine to nitroolefin was employed, the major product ultimately obtained unexpectedly consisted of an adduct formed from one mole of the piperazine and two moles of the nitroolefin.

I have found that the piperazino adducts of the nitroolefines are useful as antimicrobial and pesticidal agents for industrial, agricultural and medical applications; for example, as microbicides and microbistats for the destruction or control of soil fungi and bacteria and for the protection of seeds, bulbs and plants, as algicides in the treatment of pools and ponds, cooling water systems and the like, as nematodicides, insecticides, larvicides and ovicides, and as anthelmintics for the elimination of parasites in animals and humans.

The utility of the compounds as antimicrobial agents is shown not only by their activity against bacteria and fungi responsible for stunting the growth and even destruction of many types of crop-producing plants, but also for those causing the degradation and deterioration of many types of materials. This includes papers, leather, textiles, aqueous preparations such as latex paints, adhesives, resins, pigment dispersions and oleoresinous coatings whose films are particularly vulnerable to the destructive action of fungi. The large economic losses encountered in paper making operations caused by the accumulation of bacterial and fungal slimes in various parts of the system can be eliminated to a significant extent by the use of the compounds herein described. In agriculture, a severe problem faced in the raising of cotton, beans, corn and other crops is the loss of yield per acre due to the action of soilborne fungi on seed and on the roots of the young plants. The fungi commonly associated with this are Rhizoctonia and Fusarium and Pythium species. Excellent control and elimination of these losses has been accomplished to a major degree by the use of the adducts herein described as soil sterilants in accordance with the invention. They can also be used on foliage and trees for the control of bacterial and fungal diseases.

It is known that the aryl and certain heterocyclic substituted nitroolefins possess antimicrobial properties. However, when, for example, 1-phenyl-2-nitropropene was applied as a soil sterilant at dosages equivalent to or higher than the piperazine adduct of the present invention, complete failure resulted when the application to the soil was made prior to the planting of cotton, snap beans, lima beans and other crops, whereas for example, N-(1-phenyl-2-nitropropyl)piperazine used at lower equivalent levels afforded an unusually high degree of protection.

In other applications the utility of the nitroolefins has been severely limited because of their high degree of lachrymatory action, and irritation of skin immediately following exposure; their strong chromophoric nature; their high degree of instability and their tendency to polymerize and produce black, viscous tars. They also show a tendency to hydrolyze in the presence of water and return to the original components, the nitro group acting to promote this decomposition. This makes them unsuitable for the preservation of aqueous coating compositions against bacterial fermentation, as a storage or shelf-life protection of three years is requried by the industry.

I have found that compounds prepared by the addition of piperazine or substituted piperazine to nitroolefins, and particularly to aryl- and heterocyclic-substituted nitroolefins, not only possess unusually high antimicrobial and pesticidal and the other activities mentioned above, but offer additional advantages in handling and use over the nitroolefins because they are colorless, practically odorless, have no lachrymatory action, and are resistant to hydrolysis and polymerization. Further, they have particular adaptability to a wide variety of systems by the choice of aryl or heterocyclic groups, and because of the capacity to form salts with acids, and with a large variety of metals by simple treatment in known manner with the acid or with a basic compound of the metal (the hydroxide, carbonate, or bicarbonate), or with other types of compounds of the metals in the presence of an alkali metal base, since the compounds are both amines and nitronic acids.

Also, it is known that nitroolefins are not active in alkaline medium and should not be used with alkali or alkaline agents, and are recommended for use in media having a pH of less than 7.0 (U.S. patent to Bousquet et al., No. 2,335,384, page 2, lines 56–62). I have in fact found that alkaline solutions of nitroolefins, e.g. 1-phenyl-2-nitropropene, are inactive as growth inhibitors. In contrast, and quite unexpectedly, alkaline solutions of the products of my invention have enhanced antimicrobial activity and other growth inhibitory properties.

A wide variety of nitroolefins having 2 or more carbons in the chain, and preferably from 2 to 8, are useful as intermediates in the preparation of compounds employed in the present invention. The aromatic aldehydes employed in the preparation of aryl-substituted nitroolefins include benzaldehyde, substituted benzaldehydes, as with one or more methoxy and other lower alkoxy groups (having up to 30 but preferably up to 8 carbons), or with hydroxy, fluoro, chloro, bromo, iodo, nitro, aryl, alkyl and aralkyl (all as above defined), and including a plurality of mixed substituents; in fact, any substituents can be present which do not prevent the condensation of the aldehyde group with the nitroparaffin. Aromatic ketones capable of condensing with the nitroparaffins to form nitroolefins are equally useable. Those include benzophenones substituted as in the case of benzaldehyde, and other ketones of aryl, aralkyl and heterocyclic nature. The nitroparaffins may be nitromethane, -ethane, -propane, -butane or higher chain alkanes, as already mentioned, and isomers of these. The nitroolefins which contains heterocyclic substituents include those of furan, oxazole, pyridine, quinoline, thiazole, thiophene, indole, and other nuclei and their isomers or their derivatives which are obtainable from commercial sources or by synthesis and which have aldehyde groups or are available as ketones. These aldehydes and ketones can also be substituted in various positions of the rings with groups such as those mentioned above, which do not prevent condensation with the nitroparaffins. Certain groups in the keto-containing compound which may compete in the condensation reaction, such as aromatic amino, may first be blocked by well-known modifications, such as benzoylation or acetylation, and the compound then condensed with the nitroparaffin followed by removal of the blocking group from the nitroolefin so produced, or, the final addition of the secondary amine to such nitroolefin can be run and then the blocking group removed. For ease of isolation in other instances a carboxyl substituted nucleus may first be esterified, for example, with methyl, ethyl or benzyl alcohol, and after condensation and/or addition, saponified to liberate the esterifying alcohol.

Addition of the secondary amine (piperazine or substituted piperazine) to the nitroolefin takes place with the nitrogen of the amine linking to the carbon, designated the β-carbon, to the carbon bearing the nitro group, and the lone hydrogen of the amine joining the α-carbon, i.e. the one carrying the nitro group, as is illustrated by the following equation:

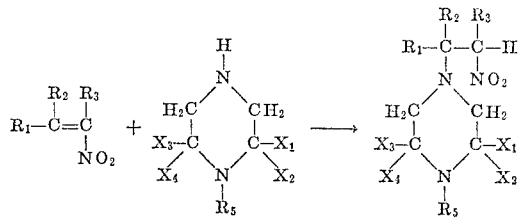

the substituents $R_1$ to $R_3$ and $R_5$ and $X_1$ to $X_4$ being as above defined.

As indicated above, either piperazine itself or substituted piperazine having at least one secondary nitrogen can be employed for the manufacture of the adducts. One of the nitrogen atoms of the piperazine may have its hydrogen replaced as indicated above in the definition of $R_5$. One or both of the two ring carbon atoms ortho to one of the nitrogen atoms of the piperazines may be similarly substituted; but both carbons ortho to at least one of the nitrogens must be unsubstituted. For example, 2,6-dimethylpiperazines do not add to nitroolefins, undoubtedly due to steric factors.

No specific time of reaction can be given which will cover the majority of the additions. It is possible for the adducts to form as rapidly as the reactants are mixed or the reaction may require a number of hours. A particularly useful method for noting the progress of the addition is to measure the disappearance of the nitroolefin. This can be done by using spectrophotometric methods in many instances, the unsaturated nitro group showing strong absorption characteristics.

The products of the reaction are separated using such techniques as precipitation, fractional crystallization, or distillation in the case of liquids, or selective salt formation with acids or bases.

In the last equation hereinabove, the hydrogen of the amino group becomes linked to the α-carbon of the nitroolefine. This hydrogen is one of the groups listed in the definition for $R_4$ and $R'_4$ hereinabove, and in the examples of the preparation of the adducts presented hereinbelow, this hydrogen is not replaced by another substituent. However, it can be replaced (as can $R_1$ to $R_3$ and $R'_1$ to $R'_3$ when any of them is hydrogen) by any of the other groups included in the definitions of such substituents hereinabove either by starting with suitably substituted nitroolefins, or by appropriate after-treatment of the formed piperazino-nitroalkanes, in known manner as illustrated by Examples 27 to 30.

The metal salts referred to above are prepared in known manner and include the salts of sodium, potassium, calcium, magnesium, strontium, barium, aluminum, zinc, tin, iron, manganese, cobalt, nickel, arsenic, antimony, bismuth, vanadium, etc.

The following examples illustrated satisfactory methods of the preparation of the compounds of the invention:

EXAMPLE 1

N-(1-phenyl-2-nitropropyl)piperazine

A novel synthesis was accomplished in which the aldehyde and nitroparaffin were condensed with simultaneous use of the piperazine both as a catalyst and as a reactant. The amine served as an effective condensation catalyst, and at the same time added on to the resulting olefin to form the adduct. The desired product was obtained in high yield and good purity in a single step. The procedure was as follows:

15 g. (.2 mole) nitroethane and 21.2 g. (.2 mole) benzaldehyde were dissolved in 50 ml. methanol. To the clear solution there were added 13.8 g. (.16 mole) piperazine, anhydrous. Within 2 minutes and without external heating the temperature rose to 51° C. to give clear, bright yellow solution. In less than 1 hour the mixture became difficult to stir because of the quantity of product which formed. It was maintained at 55° C. for 3 hours, cooled to 35° C., diluted with 75 ml. methanol and filtered. The product was washed with methanol and air-dried. A yield of 36.5 g. was obtained, over 90% of the theoretical based on piperazine.

From the filtrate there could be isolated the 2:1 adduct in less than 5% yield.

For large scale production the piperazine in methanol solution can be added gradually to the other reactants to control the exothermic reaction.

We have found that the concentration of reactants influence the relative amounts of adducts which result. For example, when the same reaction is carried out using the same proportions of reactants but increasing the solvent from 50 ml. to 500 ml., the only product obtained is the 2:1 adduct. Evidently, at high dilution the 1:1 adduct changes over to the 2:1 compound owing to the higher stability of the latter.

However, although the above-described experiments show that the 1:1 adduct is the expected product at high concentration conditions, the opposite result was, nevertheless, obtained in the synthesis of the following two products. The same proportions of reactants were used with the equivalent of only 50 ml. methanol as the reaction solvent.

EXAMPLE 2

N,N'-bis(1-p-isopropylphenyl-2-nitropropyl)piperazine 45 g. (.6 mole) nitroethane and 88.9 g. (.6 mole) p-isopropylbenzaldehyde were dissolved in 150 ml. methanol. There were then added to the clear solution 41.4 g. (.48 mole) piperazine, anhydrous. A cooling bath was used to moderate the exothermic reaction. In less than 1 hour a heavy precipitate developed. The mixture was held at 40° C. for 4 hours and allowed to cool gradually overnight. At room temperature an additional 50 ml. methanol were added and the product separated by filtration. It was washed with methanol followed by diethyl ether. A colorless solid resulted; yield 111.5 g. It was the bis-adduct melting at 166–170° C. and showing correct elemental analysis. The melting point could be raised by recrystallization.

EXAMPLE 3

N,N'-bis(1-p-methoxyphenyl-2-nitropropyl)piperazine 45 g. (.6 mole) nitroethane and 81.6 g. (.6 mole) para-anisaldehyde were dissolved in 150 ml. methanol. To this, as in the previous synthesis, there were added 41.4 g. (.48 mole) piperazine, anhydrous. The reaction temperature was maintained at 45–50° C. for 5 hours. The heavy mixture was diluted after cooling to room temperature with 50 ml. methanol and suction-filtered. The so-obtained solid was washed with methanol and diethyl ether. After thorough drying a yield of 112 g. was obtained. It melted at 163–170° C. and analyzed in good agreement for the 2:1 adduct.

The last two syntheses give products which were completely unexpected, for during a large part of the reaction the piperazine is present in large excess, especially in view of the fact that the nitroolefin is only formed gradually. Moreover, the reaction is run with very little solvent, just enough to make the mixture stirrable. Both these factors should favor the formation of the 1:1 adducts; nevertheless, the 2:1 adducts (nitroolefine:piperazine) are obtained.

EXAMPLE 4

N,N'-bis(1-phenyl-2-nitropropyl)piperazine (2-nitropropenyl)benzene (3.26 g.) was dissolved with constant stirring in anhydrous ether (2.5 ml.). Piperazine crystals (0.86 g.) were dissolved in abs. EtOH (5 ml.) and added to the clear ethereal solution of (2-nitropropenyl) benzene; almost immediately a thick white precipitate started to separate. The reaction was allowed to continue for ½ hour with stirring. The mixture was then filtered and washed with a few milliliters (5 to 10 ml.) of anhydrous ether. The crude residue weighed 2.80 g. It was recrystallied twice from hot methanol which on cooling yielded white crystals melting sharply at 172–173° C.

On recrystalliation of the above product, and of the other piperazine adducts described hereinafter, at least 2 or 3 times from same solvent, the 1:1 piperazine:alkene adduct was converted to some extent (10% or less) to the 1:2 adduct even when the reacting proportions were equimolecular.

EXAMPLE 5

N,N'-bis(1-phenyl-2-nitroethyl)piperazine

β-nitrostyrene (2.98 g., 0.02 M) was dissolved in absolute ethanol (25 ml.) with constant stirring at room temperature. Piperazine (0.86 g., 0.01 M) was dissolved in absolute EtOH (5 ml.) and was gradually added to the yellow solution of β-nitrosyrene. A white, thick precipitate deposited almost immediately. Stirring was continued for 15–20 minutes, the mixture was filtered, and the residue was washed with a few mls. of ethanol and dried. It weighed 2.90 g. It was recrystallized from acetone-water, yielding fine crystals which melt sharply at 170–172° C. The product can be recrystallized also from hot ethyl alcohol.

EXAMPLE 6

N,N'-bis(1-p-chlorophenyl-2-nitroethyl)piperazine p-Chloro-β-nitro styrene (8.67 g.) was dissolved in anhydrous ether (30 ml.) by constant stirring. Piperazine (0.86 g.) was dissolved in absolute ethyl alcohol (10 ml.) and the solution was gradually added to the clear yellow solution of p-chloro-β-nitrostyrene. The yellow color immediately disappeared, and almost immediately a flocculant white solid separated. Stirring was continued for ½ hour to complete the reaction, the mixture was filtered, and the residue washed with a few mls. (5–7) of ether. It weighed 2.5 g. It was recrystallized from hot toluene, which on cooling of the clear solution gave white crystals, M.P. 130–132° C.

EXAMPLE 7

1-piperazino-2-nitropropyl-benzene

To a solution of 1.63 g. of (2-nitropropenyl)benzene in dry ether (50 ml.) there was added gradually an alcoholic solution (5 ml.) of piperazine (0.86 g.) with constant agitation and cooling in an ice bath. Almost immediately a white, thick precipitate separated. The mixture was stirred for about 30 more minutes, and was then filtered and the residue washed with a few milliliters of dry ether. It weighted 1.9 g. The crude material melted at 153–155° C.; recrystallized from hot methanol, it melted at 165–167° C.

EXAMPLE 8

1-piperazine-2-nitro-1-p-chlorophenyl-propane

The same procedure as with the (2-nitropropenyl) benzene of Example 5 was followed, using 1.97 g. of p-chlorophenyl-2-nitropropene, and an alcoholic solution of piperazine containing 0.86 g. of the amine.

Yield: 2 g.: M.P. of the crude material 158–161° C. Twice recrystallized from methanol (hot), it melted at 166–169° C.

EXAMPLE 9

N,N'-(1-o-methoxyphenyl-2-nitropropyl)-piperazine 19.3 g. (0.1 mole) o-methoxyphenyl-2-nitropropene were dissolved in 50 ml. diethyl ether. To this clear solution without any cooling there was added a solution of 8.6 g. piperazine, anhydrous, in 30 ml. of methanol. Within 2 minutes a turbidity developed and the temperature rose to 28° C. After three hours the precipitated solid was removed by filtration, washed with 50 ml. 1:1 methanol-ether mixture and air-dried. Yield, 21.5 g.; melting begins at 131° C., clear yellow liquid forming at 145° C. For analysis, 3 g. were washed with 4×10 ml. portions methanol-ether (1:1) mixture, 2.8 g. were recovered with no change in M.P. It analyzed in excellent agreement with theory for the 1:1 adduct.

EXAMPLE 10

N,N'-bis(1-o-omethoxyphenyl-2-nitropropyl)piperazine

To an alcoholic solution containing 1.93 g. of o-methoxyphenyl-2-nitropropene there was gradually added a clear solution of piperazine (0.43 g. of ethanol), the mixture being stirred constantly and cooled in an ice-water bath. A thick white precipitate separated; this was filtered, washed with 5–10 ml. of alcohol and a few drops of ether, and dried. It weighed 1.53 g. It was recrystallized after solution in warm tetrahydrofuran; on cooling the clear solution, white needles separated which melted sharply at 153–154° C.

EXAMPLE 11

N,N'-bis(1-p-methoxyphenyl-2-nitropropyl)piperazine

This compound was prepared by the procedure of Example 10, starting with 1.93 g. of p-methoxyphenyl nitropropene and 0.43 g. of piperazine, yielding 1.8 g. of final product. The compound was recrystallized from methanol, M.P. 121–124° C.

EXAMPLE 12

N-methyl-N'-(1-phenyl-2-nitropropyl)piperazine

To phenyl nitropropene (3.26 g.) was added dropwise N-methyl piperazine (2.0 ml.). The reaction flask became fairly warm, and almost immediately a clear yellow solution resulted, which solidified at room temperature in a few minutes (5–7 minutes), leaving a faintly yellow solid 2.8 g.) which was scraped out of the flask and was very soluble in most organic solvents. It was recrystallized, using acetone-water; white long needles separted which melted sharply at 79–80° C.

EXAMPLE 13

N,N'-bis(1-o-chlorophenyl-2-nitropropyl)piperazine

To a clear alcoholic solution (15 ml.) of piperazine (2.1 g., 0.024 M) was added gradually o-chlorophenyl-2-nitropropene (9.5 ml., 0.048) with constant agitation. A thick white solid separated during the addition; stirring was continued for ½ hour. The solid was filtered, washed with a few milliliters (5–10 ml.) of alcohol-ether (50–50) and dried. It weighed 1.4 g. It was recrystallized from toluene: white crystals which melted at 135–137° C.

EXAMPLE 14

N,N'-bis(1-p-tolyl-2-nitropropyl)piperazine 1-p-tolyl-2-nitropropene (1.7 g.) was dissolved in anhydrous ether (15 ml.). Piperazine (0.43 g.) was dissolved in ethanol (5 ml.) and the clear solution was added gradually with constant stirring to the ether solution of the nitropropene, the mixture being cooled in an ice-bath. Immediately after the addition, turbidity started to appear and a white solid separated on stirring and continuous cooling for about one-half hour. The precipitate was filtered, washed with a few milliliters (5–10 ml.) of anhydrous ether, and dried. It weighed 1.5 g.

After solution in hot methanol, white cryystals deposited on cooling which melted sharply at 156–158° C.

EXAMPLE 15

N,N'-bis[1-(2,4-dichlorophenyl)-2-nitropropyl] piperazine

To an etheral solution of 2,4-dichlorophenyl-2-nitropropene (2.32 g.), an ethanolic solution of piperazine (0.46 g.) was added dropwise with constant agitation and cooling of the mixture in an ice-water bath. On completion of the addition of the piperazine solution a white turbidity appeared and a solid began to deposit, stirring and cooling were continued for about 30 minutes; the precipitate was filtered, washed with a few mls. of ether (5–10 ml.) and dried. It weighed 1.5 g.

EXAMPLE 16

N,N'-bis[1-(3,4-dichlorophenyl)-2-nitropropyl] piperazine

To an ethanolic solution of 3,4-dichlorophenyl-2- nitropropene (2.3 g.) there was added a clear alcoholic solution of piperazine (0.34 g.) with constant stirring and cooling in an ice-water bath. Instantaneously a white solid separated; stirring was continued for ½ hour in the ice bath, the solid was filtered, washed with ethanol (5–10 ml.) two times, and dried. It weighed 1.8 g.

It was recrystallized with hot methanol; on cooling, white crystals separated which melted at 169–171° C.

EXAMPLE 17

N-(1-o-chlorophenyl-2-nitropropyl)piperazine 19.75 g. 1-o-chlorophenyl - 2 - nitropropene were dissolved in 80 ml. diethyl ether with stirring. 8.6 g. piperazine anhydrous were dissolved in 30 ml. methanol and added through a condenser to the yellow, ethereal propane solution; immediately on addition a white solid separated. Stirring was continued for 1 hour. The solid was suction filtered, washed with 30 ml. 1:1 methanol-ether mixture and air-dried. Yield, 27.2 g.; M.P. 132–135° C. It analyzed correctly for the 1:1 adduct without further treatment, except for an ether and ethyl alcohol wash.

EXAMPLE 18

N,N'-bis(1-phenyl-2-nitrobutyl)piperazine 1-phenyl-2-nitrobutene (3.54 g.) was placed in a 50 ml. round bottom flask and with constant agitation by a magnetic stirrer an ethanolic solution of anhydrous piperazine (0.86 g.) was added to the clear yellow butene. The reaction flask was removed to an ice-water bath and agitation was continued for a further period of 1½ hours. Within 10–15 minutes after addition of the piperazine solution a white turbidity appeared and finally a white solid began to deposit. After the said period of agitation the solid was filtered, washed with 10–15 ml. of ethanol, and dried. The residue weighed 2.32 g. From the mother liquor more solid (0.8 g.) was isolated. The product was recrystallized after solution in warm dioxan, M.P. 179–182° C.

EXAMPLE 19

N,N'-bis-(1-[2-furyl]-2-nitropropyl)piperazine 1-(2-furyl)-2-nitropropene (3.06 g.) was dissolved with constant stirring at room temperature in diethyl ether (15 ml.). To this clear yellow solution a solution of 0.86 g. anhydrous piperazine in 5 ml. of ethyl alcohol was added while the solution was agitated for 25 minutes. Within 5 to 10 minutes after addition of the piperazine, a solid started to separate; after about one half hour the material was filtered, washed with ether (10–15 ml.) and ethanol (10–15 ml.) and dried. It weighed 1.23 g. The crude product melted at 110–113° C. It was recrystallized with toluene (hot), on cooling the crystalline product precipitated melted at 116–119° C.

EXAMPLE 20

N-1-(p-chlorophenyl)-2-nitropropyl-N'-(1-phenyl-2-nitropropyl)piperazine 1-piperazino-2-nitro-(p-chloro)-phenyl propane (2.83 g.) was dissolved completely in hot methanol (100 ml.), a clear solution was attained by prolonged heating. Phenyl-2-nitropropene (1.63 g.) was added over a period of 2 minutes to the clear warm pale yellow solution with constant stirring and cooling in a water bath at room temperature. The mixture was stirred for about 16 hours at room temperature. The solvents were partially removed under reduced pressure obtained by a water pump. Ether (30 ml.) was added but no turbidity was observed; on evaporation of the ether, the alcoholic solution was left at room temperature for 48 hours; a white crystalline compound settled in the reaction flask; it was filtered and dried. It weighed 1.26 g. It was recrystallized with toluene (hot); on cooling the white crystalline material precipitated; it melted at 162–164° C.

EXAMPLE 21

N(1-thienyl)(2-nitropropyl)piperazine 1-(2-thienyl)-2-nitropropene (1.69 g.) was dissolved completely in 75 ml. of diethyl ether with constant agitation by a magnetic stirrer. Anhydrous piperazine (0.43 g.) was dissolved in ethanol (10 ml.) and added to the clear solution of the propene; stirring was continued for one and a half hours; within a few minutes of the addition of the ethanolic piperazine solution a solid began to separate. After the stirring was completed the solid was filtered, washed with dry diethyl ether (10–15 ml.) and ethanol (5–10 ml.) and dried. It weighed 1.3 g.

It was recrystallized after a solution in hot benzene and decolorized with charcoal (Norit); on cooling, very light brown crystals separated which melted at 130–132° C.

EXAMPLE 22

N-(1-phenyl-2-nitropropyl)-2-methyl piperazine 3.26 g. of (2-nitropropenyl) benzene were dissolved at room temperature in diethyl ether (50 ml.) with stirring by a magnetic stirrer; 2-methyl piperazine (2.00 g.) was dissolved in ethanol (15 ml.) and the solution was added to the yellow clear ether solution with continued stirring. In about 2 minutes a thick white solid separated, so thick that it could not be stirred easily; more (10 ml.) ethanol was added and stirring continued for one and one half hours. The solid was filtered, washed with ether-alcohol (15–20 ml.) twice dried at room temperature and weighed: 4.00 g., M.P. (crude) 125–129° C.

The product was dissolved in warm methanol; on cooling, white crystals separated which melted at 139–142° C.

EXAMPLE 23

Fusion synthesis of N,N'-bis(1-phenyl-2-nitropropyl)piperazine 1-phenyl-2-nitropropene (14 g., .085 mole) was melted in a beaker and to the clear brown liquid at 80° C. well ground solid piperazine (3.6 g., .0425 mole) was added. The reaction was exothermic, the temperature climbs to 120° C. Mixing was continued for 10–15 minutes. The light yellow solid was cooled to room temperature, ground, and washed 3 times with diethyl ether (50 ml. portions) and dried. Yield 14.2 g. On recrystallization from hot toluol white crystals, M.P. 194–195° C. were obtained. The compound analyzed for the 2:1 adduct in excellent agreement with theory (2 moles of the 1-phenyl-2-nitropropene to one of the piperazine).

EXAMPLE 24

Di-(p-nitrobenzoic acid) salt of N,N'-bis(1-phenyl-2-nitropropyl)piperazine

Simultaneous conversion of the 1:1 compound to the 2:1 compound (2 moles of the nitropropyl compound to 1 mole of the amine) with salt formation is illustrated by the following procedure:

N-(1-phenyl-2-nitropropyl)piperazine (.824 g.) was dissolved in hot methanol (20 ml.) and the clear solution added to a methanolic solution of p-nitrobenzoic acid (.668 g.). With stirring and scratching fine white needles separated. After cooling and filtering, 1.1 g. of product was obtained. It was recrystallized from methanol, M.P. 207° C. Analysis showed it had the composition, $C_{36}H_{38}N_6O_{12}$, i.e. the salt of the 2:1 adduct with 2 moles of p-nitrobenzoic acid.

EXAMPLE 25

N-[1-(p-methylphenyl)-2-nitropropyl]piperazine 35.4 g. of 1-p-methylphenyl-2-nitropropene were dissolved in 100 ml. diethyl ether with agitation at room temperature. 17.2 g. piperazine, anhydrous, were dissolved in 30 ml. of ethanol and added to the ether solution. Within 3–5 minutes a turbidity appeared and a white solid deposited. Stirring was continued for two hours, the solid was filtered off and washed twice with a methanol-ether mixture (50:50), using 20–30 ml. The product was air dried, yield, 52 g., M.P. 140–145° C. Without any recrystallization this material analyzed correctly as the 1:1 adduct.

The product was converted to the 2:1 adduct by recrystallizing 2.0 g. from approximately 200 ml. hot methanol. On cooling a white crystalline product was obtained; yield 1.3 g., M.P. 150–152° C. which analyzed correctly for the 2:1 adduct, N,N'-bis (1-p-methylphenyl-2-nitropropyl) piperazine.

EXAMPLE 26

Salicylic acid salt of N,N'-bis(1-phenyl-2-nitropropyl) piperazine

N,N' - bis(1 - phenyl - 2 - nitropropyl)piperazine (0.64 g.) was dissolved in hot methanol (15 ml.). An alcoholic solution of salicylic acid (0.122 g.) was added to the cold solution of piperazine adduct with constant shaking and cooling. In a few moments a pinkish white crystalline solid was deposited which was cooled and filtered, washed with (1–2 ml.) of methanol and dried. It was recrystallized from hot isopropanol; the crystals were separated on cooling and melted with decomposition at 225–226° C.

By similar procedures the following additional compounds are obtained in accordance with the present invention:

(a) 1-N-piperazino-2-nitro-1-phenylethane
(b) 1-N-piperazino-2-nitro-1-phenylbutane
(c) 1-N-piperazino-2-nitro-1-phenylpentane
(d) 1-N-piperazino-2-nitro-1-phenylhexane
(e) 1-N-piperazino-2-nitro-3-methyl-1-phenylbutane
(f) 1-N-piperazino-2-nitro-1,1-diphenylpropane
(g) 2-N-piperazino-3-nitro-2-phenylbutane
(h) 2-N-piperazino-3-nitro-2-(2-thienyl) butane
(i) 1-N-piperazino-2-nitro-1-(2-furyl) propane
(j) 1-N-piperazino-2-nitro-1-(4-pyridyl) propane
(k) 1-N-piperazino-2-nitro-1-(3-pyridyl) propane
(l) 1-N-piperazino-2-nitro-1-(2-pyridyl) propane
(m) 2-N-piperazino-3-nitro-2-(3-pyridyl) butane
(n) 1-N-(N'-phenylpiperazino)-2-nitro-1-phenylpropane
(o) 1-N-(2-methylpiperazino)-2-nitro-1-phenylpropane
(p) 1-N-(2-hydroxyethylpiperazino)-2-nitro-1-phenylpropane
(q) 1-N-(N'-ethylpiperazino)-2-nitro-1-phenylpropane
(r) 1-N-(2-methylpiperazino)-2-nitro-1-(2-thienyl) propane
(s) 1-N-(N'-methylpiperazino)-2-nitro-1-(2-thienyl) propane
(t) 1-N-piperazino-2-nitro-1-p-phenylphenylpropane
(u) 1-N-piperazino-2-nitro-1-p-phenoxyphenylpropane
(v) 1-N-piperazino-2-nitro-1-p-benzylphenylpropane
(w) 1-N-piperazino-2-nitro-1-(8-hydroxy-5-quinolyl) propane
(x) 1-N-piperazino-2-nitro-1-(7-chloro-8-hydroxy-5-quinolyl) propane
(y) 1-N-piperazino-2-nitro-(2,4,5-trichlorophenyl) propane
(z) 1-N-(N'-phenyl-2-methylpiperazino)-2-nitro-1-phenylpropane
(1) $N^1$-(1-p-methoxyphenyl-2-nitropropyl)-$N^4$-(1-p-methoxyphenyl-2-nitropropyl)piperazine
(2) $N^1$-[1(2,4-dichlorophenyl)-2-nitropropyl]-$N^4$-(1-p-nitrophenyl-2-nitropropyl)piperazine
(3) $N^1$-(1-phenyl-2-nitropropyl)-$N^4$-[1-(2-thienyl)-2-nitropropyl]piperazine
(4) 1-N-piperazino-2-nitro-1-(3,4-methylenedioxyphenyl) propane
(5) 1-N-piperazino-2-nitro-1-(4-carboethoxyphenyl) propane
(6) 1,3-di-(1-N-piperazino-2-nitroethyl) benzene
(7) 1,3-di-(1-N-piperazino-2-nitropropyl) benzene Among the other substituted nitroalkenes that can form useful adducts with secondary amines may be mentioned 1- and 2-(β-nitrostyryl) naphthalene, their 5-bromo and 5-bromo and 8-nitro derivatives, 1-(β-nitrostyryl)-2,7-dimethoxy-naphthalene,
1-(β-nitrostyryl)-8-nitro-naphthalene,
4-chloro-1-(4-nitro-β-nitrostyryl) naphthalene,
2-(4-chloro-β-nitrostyryl)-6-methoxynaphthalene,
2-(4-bromo-β-nitrostyryl)-5-chloro-6-methoxy-naphthalene and
4-methyl-1-(3-nitro-β-nitrostyryl) naphthalene;

hydroxynitrostilbenes, such as 3-hydroxy-α'-nitrostilbene,
4-hydroxy-α'-nitrostilbene,
3-hydroxy-α'-nitrostilbene,
3-bromo-4-hydroxy-α'-nitrostilbene,
3-bromo-2'-chloro-4-hydroxy-α'-stilbene,
2'-chloro-3-hydroxy-α',
4-dinitrostilbene,
4-hydroxy-α',
4-dinitrostilbene,
4'-ethyl-4-hydroxy-α'-nitrostilbene, and analogous compounds prepared as described in U.S. Pat. No. 2,914,570; and the additionally substituted α'-nitrostilbenes described in U.S. Pat. No. 2,855,443.

Still other nitroalkenes which can be reacted with secondary amines in accordance with the present invention are described in U.S. Pat. Nos. 2,335,384, and 2,673,223 (which disclose, among others, 1 - [1 - cyclohexen-3-yl]-2-nitropropene); No. 2,895,869 (which discloses various chlorinated nitroalkenes, such as 3,3 - dichloro - 1 - nitro-propane, 1,1,1 - trichloro - 3 - nitro - 2 - butene, and 1,1,1 - trichloro - 3 - nitro - 2 - pentene); and in No. 2,899,429; and in the article by Schales and Graefe, "Arylnitroalkenes: A New Group of Antibacterial Agents," J.A.C.S. 74, 4486–90 (1952). All of these nitroalkenes form antimicrobial adducts with the piperazines above described and are useful as soil sterilants.

Agricultural applications.—The wettable powder formulation for use as a dispersion in water represents a practical means for good distribution in soil. Other methods of achieving the same results include the preparation of dusts. All of the nitroamines can be blended as fine powders with the commonly used powder diluents such as talc, clay, refined silicates, wood flour, sand, magnesium oxide, calcium carbonate, fuller's earth, kaolin, diatomaceous earth, mica, pumice and the like. The powder can have the following formulation:

| | Percent |
|---|---|
| Nitroamine | 1–75 |
| Inert diluent (clay, talc, etc.) | 25–99 |

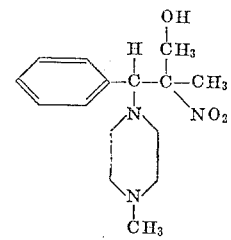

Both $R_3$ and $R_5$ can be replaced by hydroxyalkyl, as by reacting 1 - phenyl - 1 - N - piperazino - 2 - nitropropane with two molecules of formaldehyde to yield 1 - phenyl - 1 - N' - ($N^4$ - hydroxymethylpiperazino)-2-hydroxymethyl-2-nitropropane.

Procedures for introducing further substituents into the alkane radical are illustrated by the following:

EXAMPLE 27

$N^1$-(1-phenyl-2-nitro-2-hydroxymethylpropyl)$N^4$-methylpiperazine

Treatment of $N^1$-(1-phenyl-2-nitropropyl)-$N^4$-methylpiperazine in absolute ethanol containing a small amount of sodium ethylate with a 20% molar excess of 37% aqueous formaldehyde and warming at 40° C. for six hours yields the above compound.

EXAMPLE 28

$N^1$-(1-phenyl-2-nitro-2-dimethylaminomethylpropyl)- piperazine

Condensation of equimolar amounts of dimethylamine hydrochloride, 37% aqueous formaldehyde, and N-(1-phenyl-2-nitropropyl) piperazine in anhydrous methyl alcohol, by warming to 40° C. for several hours, followed by neutralization of the hydrochloride results in liberation of the free base.

EXAMPLE 29

N-(1,3-diphenyl-2-nitropropyl)piperazine

Equimolar quantities of N - (1 - phenyl - 2 - nitroethyl) piperazine and sodium ethylate are slurried in warm benzene under anhydrous conditions. Benzyl chloride is then added dropwise using a 10% molar excess. The reaction mixture is maintained at 40° C. for eight hours, cooled and filtered. The final product is washed with benzene, ethyl alcohol and finally water.

EXAMPLE 30

$N^1$(1-phenyl-2-nitro-2-carbomethoxypropyl)-$N^4$- methylpiperazine

Equimolar quantities of $N^1$-(1-phenyl-2-nitroethyl-$N^4$- methyl piperazine and sodium ethylate are slurried in warm benzene under anhydrous conditions. Dry methyl chloroacetate is then added portionwise using a 25% molar excess. The reaction mixture is stirred at 40° C. for 16 hours, cooled and filtered. The salt is washed with warm benzene, dried and then slurried in water, followed by neutralization with dilute hydrochloric acid. The final product is washed with water and dried.

Compound wherein $R_2$ is, for example chloro, $R_3$ is methyl and $R_4$ hydroxymethyl are obtained by reacting 2 - chloro - $\beta$ - nitrostyrene with N - methyl (or other alkyl groups)-piperazine, and treating the adduct with ethylene oxide to yield N'-[(1-phenyl-1-chloro-2-methyl-2-nitro-4-hydroxy)butyl]-$N^4$-methylpiperazine.

The sodium and potassium salts of the compounds of the invention are generally soluble in water; while the salts of the other metals are insoluble to varying degrees. Suitable procedures for preparing of the sodium and potassium salts are described in the following examples.

EXAMPLE 31

Sodium salt of N'(1-phenyl-2-nitropropyl)piperazine 20 grams of sodium hydroxide (0.5 mole) were dissolved in 375 grams of water. 124.5 grams of N-(1-phenyl-2-nitropropyl)piperazine (0.5 mole) were added slowly to the agitated solution. Agitation was continued for 2 hours, after which time a 27% solution of the sodium salt was obtained.

EXAMPLE 32

Potassium salt of N-(1-phenyl-2-nitropropyl)piperazine

A solution of 5.61 grams of potassium hydroxide (0.1 mole) in 69.4 grams of water was placed in an Erlenmeyer flask equipped with a magnetic stirrer. To it were added 24.9 grams of N-(1-phenyl-2-nitropropyl)piperazine (0.1 mole) slowly and stirring was continued for an hour. The resulting solution contained 29% of the potassium salt.

EXAMPLE 33

Potassium salt in glycol-water solution

Since for certain applications alcoholic or glycolic solutions are preferable, a glycolic solution of the potassium salt of N-(1-phenyl-2-nitropropyl)piperazine in glycol was prepared as follows: 11.2 grams of potassium hydroxide (0.2 mole) were added to 40 grams of water and 97 grams of ethylene glycol and stirred to complete the solution. To this there were added 49.8 grams of the piperazine adduct (0.2 mole) and the solution was stirred for one hour, producing a 29% solution of the potassium salt in glycol-water.

All of the solutions of Examples 31–33 are antimicrobially active. The compounds described herein can be combined with alkaline or basic antimicrobials without affecting their stability or activity in solution. Thus, to 20 grams of an aqueous solution containing 27% of the sodium salt of N-(1-phenyl-2-nitropropyl)piperazine there were added 10 grams of ethyl alcohol and 5 grams of 2,6-bis - dimethylaminomethyl cyclohexanone. After agitating the mixture, a stable antimicrobially active solution was obtained.

Agricultural applications.—The wettable powder formulation for use as a dispersion in water represents a practical means for good distribuution in soil. Other methods of achieving the same results include the preparation of dusts. All of the nitroamines can be blended as fine powders with the commonly used powder diluents such as talc, clay, refined silicates, wood flour, sand, magnesium oxide, calcium carbonate fuller's earth, kaolin, diatomaceous earth, mica, pumice and the like. The powder can have the following formulation:

| | Percent |
|---|---|
| Nitroamine | 1–75 |
| Inert diluent (clay, talc, etc.) | 25–99 |

The mixtures may be finely powdered, e.g. to the 1–10 micron average particle size, or be made by blending the already finely powdered ingredients.

For application as sterilants the dusts may be applied to the seed and surrounding soil at the time of planting. The concentration of the sterilant is adjusted to give an effective, nonphytotoxic dosage in the soil. In general, the soil concentration of nitroamine should be from 10 to 25 parts per million (of active ingredient). For most economical and effective use the dusts can be applied in bands of 6 to 8 inches centered on the rows just prior to seeding. The material can then be rototilled to a depth of several inches. This mode of treatment saves material and protects the root system of young plants by sterilizing the soil to a diameter of about 8 inches around the forming roots. For the protection of a given crop, such as cabbage, the band spread of sterilant can vary from 8 inches for black root disease to 12–15 inches for club root disease prevention. Similarly, the depth to which the fungicide should be distributed can vary from 2 to 6 inches.

The wettable powders can be prepared by the addition of 0.1–5% of a wetting agent to the powder blends. Many dispersing agents are commercially available which are non-phytotoxic at the required concentrations. These may, for example, be alkali metal and amine salts of sulfated and sulfonated acids, alcohols, and oils, or polyethoxylated phenols, long chain fatty amine quaternary salts, partial fatty acid esters of polyhydric alcohols, etc. The same types of dispersants can be used in preparing emulsifiable concentrates of the nitroamines in oragnic solvents. Many of these agents are available in solvent-soluble form. The manner of application to the soil is similar to the dusts. Spray equipment is used to spread the suspensions or emulsions over the soil, and by discing the fungicidal agents can be uniformly distributed to varying depths. Spray application is also effective for band-limiting the dosages.

Other agricultural uses for these formulations involve the eradication of bacterial blights of plants by application to the involved surface areas. The compounds of this invention show high orders of bacterial inhibition and are especially useful for this purpose. Some of the diseases which are of commercial importance in decreasing yield and quality and are controlled by the compositions of the invention are fire blight of apple and pear, bacterial spot on stone fruit, cherry leaf spot, walnut blight common blight of bean, bacterial spot of tomato and pepper, and potato seed piece decay. The effective concentration of nitroamines required varies from 5–100 parts per million; they may be applied as dusts, powder dispersions in water, emulsions in water, or as aqueous dipping baths. Other plant fungal diseases which can be controlled by treatment with these formulations are fungal in origin, such as the many kinds of powdery mildew and leaf scabs.

For seed treatment, proportions as low as 1 to 4 ounces per hundredweight (550 to 600 p.p.m. of seed) have been found to be effective against various fungi. Thus, in the case of N-(1-phenyl-2-nitropropyl)piperazine, 150 p.p.m. were found not only to be sufficient to protect corn seeds, but also to promote an unusually healthy root growth with an improved rate of germination of healthy seedlings and a higher yield of an improved crop.

Paint applications.—The nitroamines are highly effective as fungicides for protecting paint films against the degradation caused by such fungi as *Pullularia pullulans* and *Aspergillus niger*. They are particularly useful in overcoming another important problem in the paint industry, namely, the preservation of aqueous coatings against bacterial fermentation during storage. It is known that the principal systems in use are particularly vulnerable to such attack; these include coatings based on polyvinyl acetate, butadiene-styrene, and acrylic polymers and co-polymers. The other additives required in the formulation of aqueous coatings also contribute substantially to aiding the growth of bacteria. These nutrient sources include thickeners, such as cellulose derivatives, casein and lecithin; and also film plasticizers, coalescents, stabilizers, and dispersants. Monomers, by-product salts, and organic liquids are also metabolized by bacteria. Even the pH range at which these coatings are adjusted for maximum stability favors bacterial growth. Some of the end results of bacterial attack on these systems are foul odor development, decreased viscosity, breakdown of the colloid, and downward shift in pH. In adition, gas evolution with resultant pressure build-up in closed systems has resulted in lids of containers being blown off with scattering of contents.

The nitroamines are particularly advantageous in this application. They provide effective inhibition of microbial growth at relatively low concentrations, in the range of 5-100 parts per million, they are colorless and odorless, so that no interference with coating properties occurs, and are low in toxicity and vapor pressure. An effective use concentration to insure long shelf-life stability of the coating compositions is 0.05-0.1% by weight of the whole composition.

The nitroamines can be finely ground and then incorporated by simple mixing, or preferably, addition can be made at the pigment grinding phase of paint manufacture. This is recommended for aqueous and oleoresinous coating systems. The antimicrobial agents are compatible with practically all of the commonly used paint ingredients and unlike the presently used phenylmercury salts do not undergo degradation or other reactions with sulfide-containing pigments such as lithopone. Moreover, a decided advantage is realized in that the presence of atmospheric hydrogen sulfide causes no darkening of paint films preserved against mildew attack with the nitroamines, whereas the mercurials and other metallic agents cause colored sulfides to form.

Another advantage lies in the amphoteric nature of the nitroamines. In aqueous coating compositions a high degree of compatability exists, the compounds are fully active at either the acid or alkaline pH conditions selected in any particular case for maximum colloid stability. These include polyvinyl acetate, butadiene-styrene, and acrylic coating compositions, both homopolymer and co-polymer based. The antimicrobials can be incorporated in various known interior and exterior paints. The butadiene-styrene containing coatings are generally for interior use only and usually are not dosed with an antimicrobial agent for mildew protection. However, preservatives for in-container inhibition of fermentation must be used. A typical known type of outdoor paint which is protected against fungal attack by the addition thereto of about 0.5% by weight of, for example, N-(1-phenyl-2-nitropropyl)piperazine, 1 - piperazino - 2-nitro-1-p-tolylpropane, or N,N'-bis-[1-(o-chlorophenyl) - 2 - nitropropyl)]piperazine, by mixing in a blender for 3 minutes is the following:

| | Lbs. |
|---|---|
| Titanium dioxide | 250 |
| Zinc oxide | 200 |
| Calcium carbonate (powdered) | 400 |
| 325 mesh water ground mica | 50 |
| Alkali refined linseed oil | 300 |
| X-bodied linseed oil | 100 |
| 24% lead naphthenate | 10 |
| 6% manganese naphthenate | 1.5 |
| Mineral spirits to bring the viscosity to 82 KU (Krebs units) | 106+ |

Finished paint: Pigment volume concentration=37.8%
  4 lbs. oil/gallon
  9 lbs. pigment/gallon Filter paper specimens (1.5 inch squares of No. 30 whatman filter paper) on which films of the above paint compositions containing the different nitroamines had been dried, the papers then placed on the surface of plates of Sabouraud Maltose Agar overlaid with 1.25 ml. of spore suspension being distributed over the face of the test specimens and the plates incubated at 28-30° C. and 85-90% relative humidity showed no growth after 4 weeks; the paint containing the N-(1-phenyl-2-nitropropyl) piperazine showing also a zone of inhibition around the painted area.

A satisfactory method of incorporation of the nitroamines is by way of solutions. Many of them are soluble in such organic solvents as xylene, Stoddard solvent (petroleum distillate, at least 50% distilling at 177° C. and all at 210° C.), toluene, and turpentine, so that solutions containing 1-50% of these can be simply stirred into oil paints in sufficient amount to give final concentrations of from 0.05-1.0% by weight of total formulation, the dosage is based on the kind of areas in which the coating will be used. For example, the higher level of nitroamines would be required in blister-resistant alkyl coatings containing no zinc oxide for use in warm humid climates such as the Gulf coast area of the U.S.A. Low levels are recommended in oil paints containing high loadings of zinc oxide which give a glossy hard film on drying. In low humidity areas, e.g. the Los Angeles region, a small concenration of the nitroamine would suffice. A suitable method for determining dosage is that of J. Ramp and N. Grier (Fungicides in Paints. Official Digest, Journal of Paint Technology and Engineering, Volume 33, September 1961.)

The solvent solutions described can be made suitable for use in water-based coatings by incorporating a small percentage of emulsifying agent, usually 2-5%, and a small amount of coupling solvent, i.e. having both oil and water solubility, such as the lower alcohols, glycols, glycol ethers, dioxane, and the like, in concentrations of up to 10% of the total antimicrobial solution. This type of preparation can also be used in the oleoresinous systems without producing harmful effects on film properties.

Another mode of adding the nitroamines to aqueous coatings is by use of alkaline solution in water or water-alcohol. The nitroamines are readily dissolved in the nitronic acid form by the aid of alkaline reagents such as the inorganic alkalis like sodium hydroxide, potassium hydroxide and ammonium hydroxide, and by water-soluble amines, preferably tertiary, for maximum stability of the initial solutions.

Anthelmintic applications.—Piperazine itself will control ascarids in poultry, swine, dogs, cats, horses and other animals. It will control nodular worms in swine, sheep and cattle; and pin worms and certain Strongyle species in horses—according to Dow Chemical Company's technical literature. The nitroamines formed from piperazine have been found to possess enhanced piperazine activity. They can be used at the same dosages, weight for weight, as is recommended for piperazine, but the nitroamines correspond to a lower piperazine content, e.g. N-1-phenyl-2-nitro-propylpiperazine contains only 34% by weight of piperazine, but in view of its higher activity, the same dosage as is recommended for piperazine will usually be found to be adequate.

For animal medicated feed: A dosage of 4 lbs. of the nitroamine per ton of feed can be used. Usually, the drug is first premixed with one of the feed ingredients to insure good distributions. The concentration of the nitroamine in the feed is thus 0.2% by weight. The nitroamine is finely powdered prior to blending.

Swine: 2½ lbs. of the 0.2% feed for every 50 lbs. body weight.
Poultry:
  chickens and turkeys less than 10 weeks old (6–9 wks. old): 5 lbs. of 0.2% feed for every 50 birds.
  chickens over 10 weeks old; 5 lbs. 0.2% feed for every 40 birds.
  turkeys over 10 weeks old: 5 lbs. 0.2% feed for every 25 birds.
Dogs and cats: 0.1 gm. for every 1 lb. of body weight gms. 0.2% feed.
Horses: 0.1 gm. for every 1 lb. of body weight (50 gms. 0.2% feed).

Drinking water can be medicated and substituted for medicated feed at equivalent drug/body weight dosage. The concentration of medicament in the drinking water should be approximately one-half that in the feed to insure acceptance. Solution of the nitroamine in water to the extent of 0.1% can be obtained by the use of either acids such as phosphoric, citric, or tartaric, or alkalis. In either case the dosed water can be sweetened to secure acceptance by the animals.

The nitroamines present a distinct advantage over piperazine itself from a handling consideration. Piperazine, anhydrous, sold as such for use in feed, is extremely hygroscopic. It readily forms a hexahydrate and continues to pick up atmospheric moisture; this can cause problems of storage; e.g. caking, and also the absorption of carbon dioxide. Transfer of anhydrous piperazine by farm help introduces an additional hazard; the compound is highly alkaline, readily soluble in sweat and causes severe skin and eye burns on contact. The nitroamines are non-hygroscopic, poorly soluble in water and relatively free from handling hazards. Thus, no caking of treated feed occurs, carbon dioxide is not absorbed, and ordinary handling precautions by unskilled help suffice.

Insecticidal applications.—The products of this invention, such as 1-piperazino-2-nitro-1-(p-chlorophenyl) propane, 1-(2-methylpiperazine)-2-nitro-1-phenylpropane, 1-nitro-2-(N - piperazino)-3,3-dichloropropane, 1,1,1-trichloro-2-(N-piperazino) - 3 - nitrobutene, and 1,1,1-trichloro-2-(N-piperazino)-3-nitropentane, can be dissolved in various solvents such as the chlorinated hydrocarbons (chloroform, carbon tetrachloride, tetrachloroethylene), the aliphatic alcohols (methyl, ethyl, propyl, isopropyl, butyl), benzyl alcohol, the aromatic solvents (benzene, toluene, xylene), or in typical kerosene blends in sufficient concentrations e.g. 0.5–5.0% to cause knockdown and/or death to various insects and pests. These include the common horsefly, mites, beetles, caterpillars, milkweed bugs, aphids, nematodes, insect larvae, and the like.

The compounds of the invention can be used in the form of aqueous suspensions or emulsions, the products being generally insoluble in water. For this type of formulation various powdered carriers can be employed to aid in achieving uniform distribution. Talc, fuller's earth, calcium silicate, calcium carbonate, clays and the like are admixed with the insecticidal agent along with wetting and dispersing agents and sticking agents. For maximum chemical compatability those which are non-ionic in character are preferred. Anionic surfactants, such as sodium lauryl sulfate or sodium ligninsulfonate are also satisfactory.

In tests on nematodes (Panagrellus) suspended in water (30 to 50 individuals), the compounds N-1-(1-phenyl-2-nitropropyl) piperazine, N-1-[1-(o-chlorophenyl)-2-nitropropyl]piperazine, and N-1-[1-(p-tolyl) - 2 - nitropropyl] piperazine were all found to be substantially equal in potency to hexyl resorcinol at concentrations of 0.1 to 0.0001%, there being a 100% kill with all these compounds at concentrations of 0.1 and 0.01%, while for all compounds, including the comparison compounds, the kill fell to substantially that of the control suspension or concentrations of 0.001 and 0.0001%.

For certain uses, particularly as nematocides or as a general soil pesticide, it is desirable that the compounds employed have a sufficiently high vapor pressure to diffuse as a vapor throughout the soil and thus act as a fumigant. It is accordingly within the ambit of the invention to employ nitroalkenes which are so substituted that they have an increased vapor pressure over aryl-substituted alkenes. Thus adducts of higher vapor pressure will be obtained by employing known halogenated nitroalkenes devoid of an aryl group and heretofore suggested for use as nematocides. See the patent to Bluestone No. 2,895,869, dated July 21, 1959.

Use in paper mills.—Compounds of the invention have been found to be effective also against the organisms that cause slime and deterioration of pulp and paper mills. Thus, tested against the following organisms:

*Alcaligenes viscolactis*, ATCC 337, 24 hour cultures,
*Bacillus subtilis*, 24 hour culture,
*Salmonella typhosa*, ATCC 6539, 24 hour culture,
*Staphylococcus aureus*, ATCC 6538, 24 hour culture, the compound N-(1-phenyl-2-nitropropyl)piperazine inhibited growth at concentrations of about 20 to 40 p.p.m.

The nitrogens of the piperazino moiety can be quaternized to yield compounds having properties similar to the bases. Thus, the compounds can be treated with ethyl chloride, benzyl chloride, ethyl sulfate and other quaternizing agents in known manner. Also, acid salts, as already indicated, can be formed of the bases, for example, the hydrochloric, sulfuric, phosphoric, p-toluenesulfonic and the acid salts of N-(1-phenyl-2-nitropropyl) piperazine. Also, because of the nitronic acid group, various amine salts can be prepared in known manner, such as salts with triethanolamine, triethyl amine, tributylamine, tripropanolamine and the like.

There is described hereinabove the formation of the salicylic acid salt of one of the active compounds of the invention. The analogous fashion there can be prepared also the hydrochloride, p-toluene sulfonate, phosphate, sulfopalmitate and other acid salts, of such compound and of the other compounds embraced by the present invention.

What is claimed is:

1. An aqueous paint having dispersed therein an antibacterial and antifungal quantity of a compound of the formula:

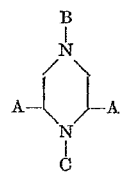

wherein A is hydrogen, loweralkyl or hydroxyloweralkyl; B is

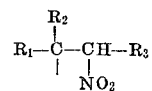

wherein $R_1$, $R_2$ and $R_3$ are hydrogen, Q, loweralkyl- or substituted loweralkyl wherein the substituent is halo; wherein:

Q is phenyl or substituted phenyl wherein the substituents are loweralkyl, loweralkoxy, loweralkylenedioxy, carboxyloweralkoxy, phenyl, phenoxy, phenylloweralkyl, halo, p-nitro or tolyl;

naphthyl or substituted naphthyl wherein the substituents are loweralkyl, loweralkoxy, halo or nitro;

cyclohexyl;

a heterocyclic radical selected from the group consisting of furyl, pyridyl and thienyl;

quinolinyl or substituted quinolinyl wherein the substituents are hydroxy or chloro;

C is B, phenyl, loweralkyl or hydrogen; and provided that where A is other than hydrogen, C is other than B.

2. An aqueous paint of claim 1 wherein the compound is N-(1-phenyl-2-nitropropyl)piperazine.

References Cited

UNITED STATES PATENTS 3,223,547   12/1965   Bindler et al. _____ 260—41 C

MORRIS LIEBMAN, Primary Examiner

P. N. THOMAS, JR., Assistant Examiner

U.S. Cl. X.R.

106—15 R; 260—29.7 E, 41 B, 45.8 N